United States Patent
Hsu et al.

(10) Patent No.: US 12,079,338 B2
(45) Date of Patent: Sep. 3, 2024

(54) SYSTEM AND METHOD OF FILELESS MALWARE DETECTION AND NON-TRANSITORY COMPUTER READABLE MEDIUM

(71) Applicant: National Central University, Taoyuan (TW)

(72) Inventors: Fu-Hau Hsu, Taichung (TW); Teng-Chuan Hsiao, New Taipei (TW); Chia-Hao Lee, Miaoli County (TW)

(73) Assignee: National Central University, Taoyuan (TW)

( * ) Notice: Subject to any disclaimer, the term of this patent is extended or adjusted under 35 U.S.C. 154(b) by 584 days.

(21) Appl. No.: 17/210,527

(22) Filed: Mar. 24, 2021

(65) Prior Publication Data

US 2022/0253528 A1 Aug. 11, 2022

(30) Foreign Application Priority Data

Feb. 9, 2021 (TW) ................. 110104905

(51) Int. Cl.
*G06F 21/56* (2013.01)
*G06F 21/51* (2013.01)

(52) U.S. Cl.
CPC ............ *G06F 21/565* (2013.01); *G06F 21/51* (2013.01); *G06F 21/568* (2013.01)

(58) Field of Classification Search
None
See application file for complete search history.

(56) References Cited

U.S. PATENT DOCUMENTS

| | | | |
|---|---|---|---|
| 7,392,543 B2 | 6/2008 | Szor | |
| 10,860,718 B2 | 12/2020 | Seetharamaiah et al. | |
| 2009/0248957 A1* | 10/2009 | Tzeng | G06F 13/4239 711/E12.008 |
| 2019/0034633 A1* | 1/2019 | Seetharamaiah | G06F 9/45558 |

FOREIGN PATENT DOCUMENTS

| | | |
|---|---|---|
| CN | 1648812 A | 8/2005 |
| CN | 104778408 A | 7/2015 |
| CN | 109583202 A | 4/2019 |
| CN | 111523012 A | 8/2020 |
| CN | 111753301 A | 10/2020 |
| EP | 1315066 A1 | 5/2003 |
| EP | 3210153 A1 | 8/2017 |
| JP | 2018194880 A | 12/2018 |
| JP | 6585131 B2 | 10/2019 |

(Continued)

OTHER PUBLICATIONS

Alain Alzuri et al., "The growth of fileless malware," IEEE, 2019.
(Continued)

*Primary Examiner* — Richard A McCoy
(74) *Attorney, Agent, or Firm* — CKC & Partners Co., LLC

(57) ABSTRACT

The present disclosure provides a system and a method of fileless malware detection, and the method of the fileless malware detection includes steps as follows. The execution of the writable section in the memory is intercepted; the executable code corresponding to the execution is extracted from the writable section; whether the executable code is malicious is analyzed.

12 Claims, 3 Drawing Sheets

(56) References Cited

FOREIGN PATENT DOCUMENTS

| TW | I469655 B | 1/2015 |
| TW | M564751 U | 8/2018 |

OTHER PUBLICATIONS

Rami Sihwail et al., "Malware detection approach based on artifacts in memory image and dynamic analysis," Applied Sciences, vol. 9, Sep. 2019.

Denis Silakov, "Using Hardware-Assisted Virtualization to Protect Application Address Space Inside Untrusted Environment", Programming and Computer Software, 38(1):24-33, Jan. 2012, published on website: https://www.researchgate.net/publication/220203996_Using_virtualization_to_protect_application_address_space_inside_untrusted_environment.

* cited by examiner

SYSTEM AND METHOD OF FILELESS MALWARE DETECTION AND NON-TRANSITORY COMPUTER READABLE MEDIUM

This application claims priority to Taiwan Application Serial Number 110104905, filed Feb. 9, 2021, which is herein incorporated by reference.

BACKGROUND

Field of Invention

The present invention relates to computer systems and methods, and more particularly, systems and methods of fileless malware detection.

Description of Related Art

Fileless virus is actually an attack technique. It is a malicious attack that uses programs that have been installed on the computer and are considered safe, and malicious programs can be executed in the memory through different methods. The malicious executable file is not directly downloaded to the hard drive, and therefore its threats will not be found in the file. When the malicious program appears, the code is ready to be executed in the memory to bypass the defense of the antivirus software.

In view of the foregoing, there still exist some problems on the fileless virus that await further improvement. However, those skilled in the art sought vainly for a solution. Accordingly, there is an urgent need in the related field to solve or circumvent above problems and disadvantages.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides systems and methods of fileless malware detection, to solve or circumvent aforesaid problems and disadvantages in the related art.

An embodiment of the present disclosure is related to a system of fileless malware detection, and the system includes a memory and a processor. The processor is electrically connected to the memory, the processor is configured to execute a check program for: intercepting an execution of a writable section in the memory; extracting an executable code corresponding to the execution from the writable section; analyzing whether the executable code is malicious.

In one embodiment of the present disclosure, the processor is configured to execute the check program for: when an instruction is the execution, checking whether a NX bit (No eXecute bit) in a PTE (Page Table Entry) is 1; when the NX bit is checked as 1, triggering a page fault exception, and then determining whether a virtual memory area corresponding to the instruction is writable; when the virtual memory area is writable, determining whether the virtual memory area is marked as executable; when the virtual memory area is marked as executable, restoring the NX bit to 0 so as to restore the PTE in a normal state, packaging a program code corresponding to the instruction from the virtual memory area into an ELF (Executable and Linkable Format) File to be scanned, and determining whether the instruction can be executed according to a scan result.

In one embodiment of the present disclosure, the processor is configured to execute the check program for: when the NX bit is checked as 0, allowing the execution.

In one embodiment of the present disclosure, the processor is configured to execute the check program for: when the virtual memory area is not writable, terminating the execution.

In one embodiment of the present disclosure, the processor is configured to execute the check program for: when receiving a system call as a default check item, checking a position of a file corresponding to the system call to determine whether the file is in the memory; when the file is in the memory, scanning the file and determining whether the file can be executed according to a scan result.

Another embodiment of the present disclosure is related to a method of fileless malware detection, and the method includes steps of: intercepting an execution of a writable section in a memory; extracting an executable code corresponding to the execution from the writable section; analyzing whether the executable code is malicious.

In one embodiment of the present disclosure, the method further includes steps of: when an instruction is the execution, checking whether a NX bit in a PTE is 1; when the NX bit is checked as 1, triggering a page fault exception, and then determining whether a virtual memory area corresponding to the instruction is writable; when the virtual memory area is writable, determining whether the virtual memory area is marked as executable; when the virtual memory area is marked as executable, restoring the NX bit to 0 so as to restore the PTE in a normal state, packaging a program code corresponding to the instruction from the virtual memory area into an ELF File to be scanned, and determining whether the instruction can be executed according to a scan result.

In one embodiment of the present disclosure, the method further includes steps of: when the NX bit is checked as 0, allowing the execution.

In one embodiment of the present disclosure, the method further includes steps of: when the virtual memory area is not writable, terminating the execution.

In one embodiment of the present disclosure, the method further includes steps of: when receiving a system call as a default check item, checking a position of a file corresponding to the system call to determine whether the file is in the memory; when the file is in the memory, scanning the file and determining whether the file can be executed according to a scan result.

Yet another embodiment of the present disclosure is related to a non-transitory computer readable medium to store a plurality of instructions for commanding a computer to execute a method of fileless malware detection, and the method includes steps of: intercepting an execution of a writable section in a memory; extracting an executable code corresponding to the execution from the writable section; analyzing whether the executable code is malicious.

In view of the above, according to the present disclosure, the system and method of the fileless malware detection have a very high detection rate in the face of attacks executed after the malware is implanted in the memory, and can provide a good protection effect.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
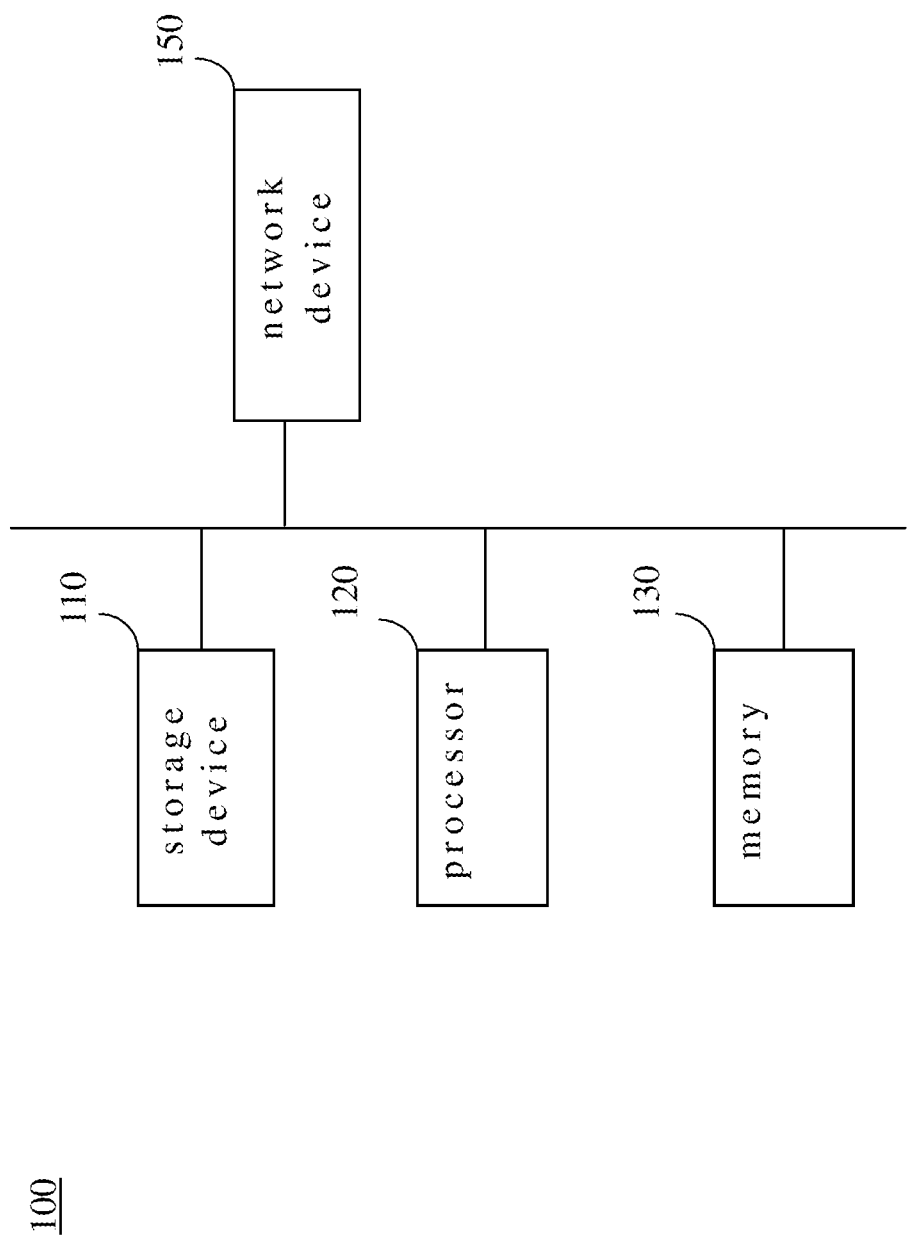
FIG. 1 is a block diagram of a system of fileless malware detection according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1. In one aspect, the present disclosure is directed to a system 100 of the fileless malware detection, This system may be easily integrated into a computer server and may be applicable or readily adaptable to all technologies. Since fileless malicious programs are not easy to be detected as traditional malicious programs, attackers uses various techniques to hide malicious programs so that the malicious programs do not need to be written to disk first and can be executed directly in the memory, so as to circumvent the detection of anti-virus software. Therefore, in the present disclosure, inventors propose a check mechanism, named "Check-on-Execute (COE)". When the program needs to execute a piece of code in the memory section that is writable and executable, or when only saving the file in the memory, COE can suspend this unchecked execution and check its code. Then, based on the result of the check, it is determined whether the execution is allowed, so as to prevent the system from being attacked by fileless malware. Accordingly, the system 100 of the fileless malware detection has advantages. Herewith the system 100 of the fileless malware detection is described below with FIGS. 1 and 2.

The subject disclosure provides the system 100 of the fileless malware detection in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

In practice, for example, the system 100 of the fileless malware detection can be a computer host or a computer server. The computer server can be remotely managed in a manner that provides accessibility, consistency, and efficiency. Remote management removes the need for input/output interfaces in the servers. An administrator can manage a large data centers containing numerous rack servers using a variety of remote management tools, such as simple terminal connections, remote desktop applications, and software tools used to configure, monitor, and troubleshoot server hardware and software.

FIG. 1 is a block diagram of the system 100 of the fileless malware detection according to some embodiments of the present disclosure. As shown in FIG. 1, the system 100 of the fileless malware detection can includes a storage device 110, a processor 120, a memory 130 and a network device 150.

For example, the storage device 110 can be a hard disk or other storage media, the processor 120 can be a central processor, the memory 130 can be dynamic random access the memory or other volatile the memory, and the network device 150 can be network communication equipment (e.g., a network card) and/or other transmission equipment.

In structure, the processor 120 is electrically connected to the storage device 110, the memory 130, and the network device 150. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the storage device 110 may be a built-in storage device that is directly connected to the processor 120, or the printing device 133 may be an external storage device that is indirectly connected to the processor 120 through the network device 150.

In use, the storage device 110 can store operating system (e.g., Linux operating system or other operating systems) and program instructions of COE. The processor 120 accesses and executes the aforementioned program instructions to execute a check program for: intercepting an execution of a writable section in the memory; extracting an executable code corresponding to the execution from the writable section; analyzing whether the executable code is malicious, so as to effectively prevent the system 100 from being attacked by the fileless malware.

Figure 2:
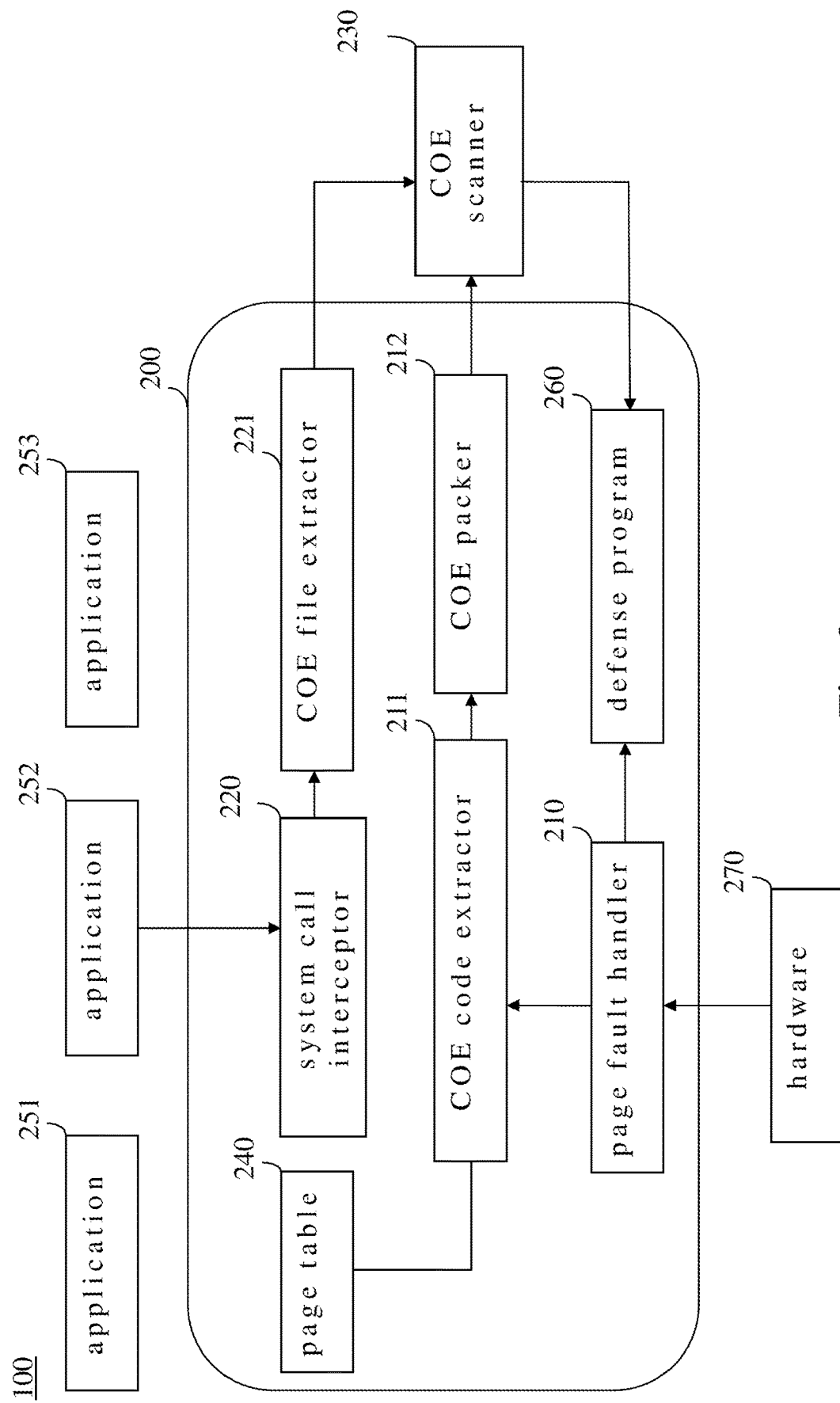
FIG. 2 is a schematic diagram of the fileless malware detection in operation according to some embodiments of the present disclosure.

For a more complete understanding of the system 100 of the fileless malware detection in operation, refer to FIGS. 1 and 2. FIG. 2 is a schematic diagram of the system 100 of the fileless malware detection in operation according to some embodiments of the present disclosure. The storage device 110 can also store the applications 251, 252, and 253, and the processor 120 can access and execute the applications 251, 252, and 253. The hardware 270 can be the storage device 110, the processor 120, the memory 130, the network device 150 and/or other the hardware circuits.

In operation, the processor 120 accesses and executes the program instructions of COE to execute the check program, where in the OS (operating system) kernel 200, a page fault handler 210 and a system call interceptor 220 can perform the interception. The software components implemented in the page fault handler 210 are a COE code extractor 211 and a COE packer 212. The software component implemented in the system call interceptor 220 is a COE file extractor 221. In addition, the software component in the user space is a COE scanner 230, such as virus scanning software.

In the operating system, the virtual memory areas of processes are scattered in different areas of the memory 130. For example, when a process related to the hardware 270 requests a virtual memory area, the OS kernel 200 maps the corresponding virtual address to the memory 130. The OS kernel 200 stores the virtual address to physical address mappings in the page table 240, and each mapping is called the PTE (Page Table Entry). As used in the description herein and throughout the claims that follow, the meaning of "a", "an", and "the" includes reference to the plural unless the context clearly dictates otherwise. For example, the virtual memory area may correspond to one or more areas of the memory 130.

In one embodiment of the present disclosure, the main function of the COE code extractor 211 is to extract the code from the memory 130, and it uses the NX bit (No execute bit) provided by the operating system (e.g., the Linux operating system). When the NX bit on the PTE is set to 1, if there is an illegal execution, the page fault exception will be triggered. When configuring the PTE in advance, the COE of the present disclosure can set a writable and executable memory block as non-executable by setting the NX bit to 1. Therefore, when the execution occurs in the writable area, it enters the COE code extractor 211 designed by the present disclosure.

In one embodiment of the present disclosure, the processor 120 executes a check program for checking whether the NX bit in the PTE is 1 when the instruction related to the hardware 270 is the execution.

Then, when the NX bit is checked as 0, allowing the execution. On the contrary, when the NX bit is checked as 1, the page fault exception is triggered, and the page fault handler 210 determines whether the virtual memory area corresponding to the instruction is writable. For example, the page fault exception can be an interruption outputted by the processor 120 based on the NX bit of 1 when the software tries to access a page that has been mapped in the virtual address but is not already loaded in the memory 130.

In order to effectively prevent the fileless malware, when the virtual memory area is not writable, the defense program 260 terminates the execution. On the contrary, when the virtual memory area is writable, the COE file extractor 211 further determines whether the virtual memory area is marked as executable.

Then, when the virtual memory area is marked as non-executable, the defense program 260 terminates the execution. On the contrary, when the virtual memory area is marked as executable, the further check is needed before the execution can be performed for preventing the fileless malware attack. Specifically, the NX bit is restored to 0, so as to restore the PTE in the normal state, and then a program code corresponding to the instruction from the virtual memory area packages into the ELF (Executable and Linkable Format) file that can be scanned, and it is determined whether the instruction can be executed according to a scan result. In practice, for example, the COE packer 212 reads the program code from the memory 130 and packs the program code into the ELF file, merges the header of the ELF file, and writes the program code into the entry point position and other parts for subsequent scans.

Specifically, the ELF is a format that can be scanned by the COE scanner 230 (e.g., virus scanning software). The main function of the COE scanner 230 is to scan the packaged ELF file to generate the scan result. In practice, for example, the COE scanner 230 can be implemented as an application interface (API) of VirusTotal. The VirusTotal provides malware analysis services and has more than 60 antivirus software programs for detection.

For example, when the scan result indicates that the program code is malicious, the defense program 260 terminates the execution. On the contrary, when the scan result indicates that the program code does not contain malicious programs, the scan result is determined to be safe, and the PTE is restored to the executable permission, the processor 120 executes the instruction.

In addition, for example, the application 252 in the user space can send a system call to the OS kernel 200, so as to request the OS kernel 200 for services that require higher authority to run. In practice, the system call provides an interface between the user space and the operating system.

In one embodiment of the present disclosure, the processor 120 executes a check program, in which the system call interceptor 220 determines whether the system call is a default check item, such as execve( ), the main function of the COE file extractor 221 is to intercept the execution of the files in the memory 130. Specifically, when the system call is the default check item, the COE file extractor 221 checks a position of the file corresponding to the system call to determine whether the file is in the memory 130.

Then, when the file is not in the memory 130, the processor 120 allows the execution. On the contrary, when the file is in the memory 130, the COE scanner 230 scans the file to generate a scan result, and the processor 120 determines whether the file can be executed according to the scan result.

For example, when the scan result indicates that the file is malicious, the defense program 260 terminates the execution. On the contrary, when the scan result indicates that the file does not contain malicious programs, the processor 120 performs the execution.

The page fault handler 210, the COE code extractor 211, the COE packer 212, the system call interceptor 220, the COE file extractor 221, the defense program 260 and the COE scanner 230 may be different software programs or the same software program. One of ordinary skill in the art will appreciate that the above denomination is provided for illustrative purposes only to further explain applications of these software programs and are not meant to limit the number of software programs and functions in any manner. In one embodiment, one software program may be divided into various software programs, or one software program may be integrated into another software program. Those with ordinary skill in the art may design one or more these software programs depending on the desired application.

Figure 3:
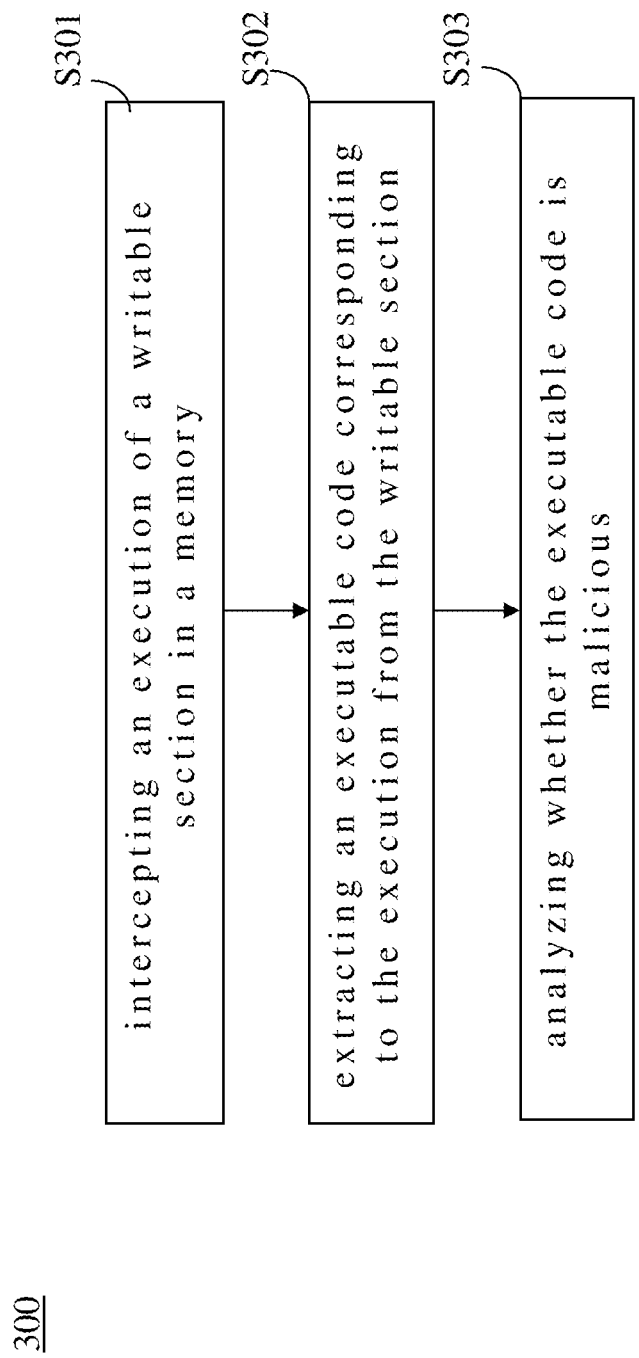
FIG. 3 is a flow chart of a method of the fileless malware detection according to some embodiments of the present disclosure.

For a more complete understanding of a method performed by the the system 100 of the fileless malware detection, referring FIGS. 1-3, FIG. 3 is a flow chart of the method 300 of the fileless malware detection according to an embodiment of the present disclosure. As shown in FIG. 3, the method 300 includes operations S301, S302 and S303. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

The method 300 of the fileless malware detection may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In one embodiment of the present disclosure, in operation S301, an execution of a writable section in a memory 130 is intercepted; in operation S302, an executable code corresponding to the execution is extracted from the writable section; in operation S303, whether the executable code is malicious is analyzed, so as to effectively prevent the system 100 from being attacked by the fileless malware.

When a process related to the hardware 270 requests a virtual memory area, the OS kernel 200 maps the corresponding virtual address to the memory 130. The OS kernel 200 stores the virtual address to physical address mappings in the page table 240, and each mapping is called the PTE. In one embodiment of the present disclosure, in the method 300 of the fileless malware detection, whether the NX bit in the PTE is 1 is checked when the instruction related to the hardware 270 is the execution.

Then, in the method 300 of the fileless malware detection, when the NX bit is checked as 0, allowing the execution; on the contrary, when the NX bit is checked as 1, the page fault exception is triggered, and it is determined whether the virtual memory area corresponding to the instruction is writable. For example, the page fault exception can be an interruption outputted by the processor 120 based on the NX bit of 1 when the software tries to access a page that has been mapped in the virtual address but is not already loaded in the memory 130.

In order to effectively prevent the fileless malware, in the method 300 of the fileless malware detection, when the virtual memory area is not writable, the defense program 260 terminates the execution; on the contrary, when the virtual memory area is writable, it is further determined whether the virtual memory area is marked as executable.

Then, in the method 300 of the fileless malware detection, when the virtual memory area is marked as non-executable, the execution is terminated; on the contrary, when the virtual memory area is marked as executable, the further check is needed before the execution can be performed for preventing the fileless malware attack. Specifically, the NX bit is restored to 0, so as to restore the PTE in the normal state, and then a program code corresponding to the instruction from the virtual memory area is packaged into the ELF file that can be scanned, and it is determined whether the instruction can be executed according to a scan result.

In the method 300 of the fileless malware detection, the ELF is a format that can be scanned by the COE scanner 230 (e.g., virus scanning software). The COE scanner 230 scans the packaged ELF file to generate the scan result. For example, when the scan result indicates that the program code is malicious, the execution is terminated; on the contrary, when the scan result indicates that the program code does not contain malicious programs, that is, the scan result is determined to be safe, and the PTE is restored to the executable permission, the instruction is executed.

In addition, as to operations of the application 251, 252, 253, for example, the application 252 in the user space can send a system call to the OS kernel 200, so as to request the OS kernel 200 for services that require higher authority to run.

Then, in the method 300 of the fileless malware detection, it is determined whether the system call is a default check item, such as execve( ). When the system call is the default check item, a position of the file corresponding to the system call is checked to determine whether the file is in the memory 130.

Then, in the method 300 of the fileless malware detection, when the file is not in the memory 130, the execution is allowed; on the contrary, when the file is in the memory 130, the file is scans to generate a scan result, and it is determined whether the file can be executed according to the scan result. For example, when the scan result indicates that the file is malicious, the defense program 260 terminates the execution. On the contrary, when the scan result indicates that the file does not contain malicious programs, the processor 120 performs the execution.

In view of the above, according to the present disclosure, the system 100 and method 300 of the fileless malware detection have a very high detection rate in the face of attacks executed after the malware is implanted in the memory, and can provide a good protection effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system of fileless malware detection, and the system comprising:
 a memory; and
 a processor electrically connected to the memory, and the processor configured to execute a check program for:
 intercepting an execution of a writable section in the memory;
 extracting an executable code corresponding to the execution from the writable section;
 analyzing whether the executable code is malicious;
 when an instruction is the execution, checking whether a NX bit (No execute bit) in a PTE (Page Table Entry) is 1;
 when the NX bit is checked as 1, triggering a page fault exception, and then determining whether a virtual memory area corresponding to the instruction is writable in response to that the page fault exception is triggered;
 determining whether the virtual memory area is marked as executable in response to determining that the virtual memory area is writable; and
 restoring the NX bit to 0 so as to restore the PTE in a normal state in response to determining that the virtual memory area is marked as executable, packaging a program code corresponding to the instruction from the virtual memory area into an ELF (Executable and Linkable Format) File to be scanned through a virus scanning software to generate a scan result, and determining whether the instruction can be executed according to the scan result.

2. The system of claim 1, wherein the processor is configured to execute the check program for:
 when the NX bit is checked as 0, allowing the execution.

3. The system of claim 1, wherein the processor is configured to execute the check program for:
 when the virtual memory area is not writable, terminating the execution.

4. The system of claim 1, wherein the processor is configured to execute the check program for:
 when receiving a system call as a default check item, checking a position of a file corresponding to the system call to determine whether the file is in the memory; and
 when the file is in the memory, scanning the file and determining whether the file can be executed according to a scan result.

5. A method of fileless malware detection, and the method comprising:
 intercepting an execution of a writable section in a memory;

extracting an executable code corresponding to the execution from the writable section;

analyzing whether the executable code is malicious;

when an instruction is the execution, checking whether a NX bit in a PTE is 1;

when the NX bit is checked as 1, triggering a page fault exception, and then determining whether a virtual memory area corresponding to the instruction is writable in response to that the page fault exception is triggered;

determining whether the virtual memory area is marked as executable in response to determining that the virtual memory area is writable; and restoring the NX bit to 0 so as to restore the PTE in a normal state in response to determining that the virtual memory area is marked as executable, packaging a program code corresponding to the instruction from the virtual memory area into an ELF File to be scanned through a virus scanning software to generate a scan result, and determining whether the instruction can be executed according to the scan result.

6. The method of claim 5, further comprising:

when the NX bit is checked as 0, allowing the execution.

7. The method of claim 5, further comprising:

when the virtual memory area is not writable, terminating the execution.

8. The method of claim 5, further comprising:

when receiving a system call as a default check item, checking a position of a file corresponding to the system call to determine whether the file is in the memory; and when the file is in the memory, scanning the file and determining whether the file can be executed according to a scan result.

9. A non-transitory computer readable medium to store a plurality of instructions for commanding a computer to execute a method of fileless malware detection, and the method comprising:

intercepting an execution of a writable section in a memory;

extracting an executable code corresponding to the execution from the writable section;

analyzing whether the executable code is malicious;

when an instruction is the execution, checking whether a NX bit in a PTE is 1;

when the NX bit is checked as 1, triggering a page fault exception, and then determining whether a virtual memory area corresponding to the instruction is writable in response to that the page fault exception is triggered;

determining whether the virtual memory area is marked as executable in response to determining that the virtual memory area is writable; and restoring the NX bit to 0 so as to restore the PTE in a normal state in response to determining that the virtual memory area is marked as executable, packaging a program code corresponding to the instruction from the virtual memory area into an ELF File to be scanned through a virus scanning software to generate a scan result, and determining whether the instruction can be executed according to the scan result.

10. The non-transitory computer readable medium of claim 9, wherein the method further comprises:

when the NX bit is checked as 0, allowing the execution.

11. The non-transitory computer readable medium of claim 9, wherein the method further comprises:

when the virtual memory area is not writable, terminating the execution.

12. The non-transitory computer readable medium of claim 9, wherein the method further comprises:

when receiving a system call as a default check item, checking a position of a file corresponding to the system call to determine whether the file is in the memory; and when the file is in the memory, scanning the file and determining whether the file can be executed according to a scan result.

\* \* \* \* \*